United States Patent [19]

Boes

[11] Patent Number: 5,009,154
[45] Date of Patent: Apr. 23, 1991

[54] TWINE FEEDING APPARATUS FOR ROUND HAY BALERS

[76] Inventor: Rudolph Boes, P.O. Box 112, Big Falls, Minn. 56627

[21] Appl. No.: 476,167

[22] Filed: Feb. 7, 1990

[51] Int. Cl.⁵ .......................... B65B 63/04; B30B 5/06
[52] U.S. Cl. .......................................... 100/5; 56/343; 100/88
[58] Field of Search .......................... 100/5, 15, 87–89; 56/341–343; 226/181, 186, 187, 190

[56] References Cited

U.S. PATENT DOCUMENTS

| 2,410,159 | 10/1946 | Harrer et al. | 100/5 |
| 2,424,821 | 7/1947 | Harrer | 100/5 X |
| 2,581,542 | 1/1952 | Kolzing | 100/88 X |
| 3,869,849 | 3/1975 | Ulrich | 56/343 |
| 4,133,258 | 1/1979 | Popiolek et al. | 100/5 |
| 4,182,235 | 1/1980 | Harig | 100/5 X |
| 4,455,930 | 6/1984 | Crawford | 100/5 X |

FOREIGN PATENT DOCUMENTS 2204563 11/1988 United Kingdom ..................... 100/5

Primary Examiner—Harvey C. Hornsby
Assistant Examiner—Stephen F. Gerrity

[57] ABSTRACT

A twine feeding assembly for round hay baling machines which incorporates one or more twine feed members which cooperate with freely rotatable first sheaves mounted intermediate sections of the main hay feed press roller and second freely rotatable sheaves mounted intermediate sections of the main hay feed or belt drive drum which sheaves are operative to guide and feed a single wrap of twine about the hay as it is rolled after which the twine is knotted and cut and the tied bale discharged from the machine.

5 Claims, 3 Drawing Sheets

TWINE FEEDING APPARATUS FOR ROUND HAY BALERS

BACKGROUND OF THE INVENTION

1. Field of the Invention

This invention is generally related to round hay baling machines and more specifically to a twine feed assembly which cooperates with portions of the feed drum and main hay feed press roller to introduce a continuous single loop of twine about the hay as it is rolled within the baling machine. More specifically, sheaves are mounted so as to be freely rotatable with respect to spaced segments of each of the hay feed press roller and the main hay feed belt drive drum so that twine being fed into the machine will pass into the machine together with the hay and expand outwardly as the hay is rolled without the twine experiencing adverse frictional engagement with the press roller and feed drum as the twine will pass over and in between the freely rotatable sheaves. In addition, the invention further includes a twine feed mechanism which allows for the free-end of the twine to be engaged and secured and which is pivotable so as to introduce an intermediate section of the twine into the space between the main hay feed press roller and the main belt drive drum so that the intermediate portion of the twine will be engaged by the hay as it enters into the bale forming belts of the baling machine.

With the present invention, after the bale has reached its desired size, a release mechanism is actuated which causes the knotter assembly to pivot to knot the twine after which the twine is cut so that the bale is free to be discharged from the baling machine.

The twine feed assemblies of the present invention act to provide a single wrap of twine about the bale of hay at each location in which sheaves are positioned along the length of the feed press roller and belt drive drum, respectively. In some instances where extremely small bales are being rolled, a single wrap of twine may be sufficient to bind the bale after it has been rolled. Generally, however, at least two twine feed assemblies will be incorporated thereby requiring two sets of spaced sheaves to be mounted along the length of the hay intake or feed press roller and the belt drive drum through which twine may be played out, knotted and cut by the twine feed members of the present invention. Additional twine feed assemblies may be incorporated if necessary.

2. History of the Related Art

Although there are various structures for forming round hay bales, the present invention is designed to be incorporated with the type of round hay balers which incorporate a feed or press roller which is spaced adjacent to a belt drive drum and wherein the hay is introduced between the belts driven by the primary belt drive drum and the hay feed or press roller. After passing between the hay feed roller and the primary belts, the hay is engaged between oppositely rotating sets of belts which belts are mounted so as to be expandable relative to one another as the hay continues to be introduced into the machine with the roll of hay increasing in diameter. An example of such a machine is disclosed in U.S. Pat. No. 2,424,821 to Harrer. The contents of this patent are incorporated into the specification to disclose the association of the primary belt drive roll or drum and the primary hay feed roller or press roll. Further, this reference discloses one manner in which the twine which is utilized to wrap rolled bales of hay is mounted with respect to the belts which are utilized to form the rolled bales of hay.

In U.S. Pat. No. 2,410,159 to Harrer et al., one type of twine feed mechanism is disclosed for use in hay balers such as disclosed in Harrer U.S. Pat. No. 2,424,821. With this type of feed apparatus, the end of the twine is introduced between the belt drive drum and the press roller after the bale has achieved a predetermined dimension. The twine feed mechanism initially introduces the free-end of the twine between the press roll and the drive drum and thereafter a special carrier is moved across the length of the press roll and belt drive drum so that the twine is wrapped in a spiral manner across the full length of the rolled hay bale. After the bale has been wrapped, the twine is knotted and cut and the bale is discharged from the machine. With this type of tying apparatus, an excessive amount of twine is required to secure each bale that is formed within the baling machine. This is due to the necessity that the twine be wrapped in a spiral manner from one end to the other of the general cyclindrical roll of hay and in some instances a double wrap is utilized to secure the bale.

In addition to the extreme waste of twine which is associated with such prior art twining devices, when the twine is introduced between the press roll and the belt drive drum, the amount of friction created by the drums and rollers engaging the twine is significant and can sometimes result in actually severing the twine as the twine is being wrapped about the rolled bale of hay. For this reason, such an arrangement is not believed to be efficient or satisfactory for continuous operation during use. If a length of twine is severed, the operator must re-initiate the tying procedure by restarting the movement or operation of the twine feed mechanism. This results in down time during the baling operating which is also undesirable.

Additional examples of binding mechanisms for round hay balers are disclosed in U.S. Pat. No. 4,133,258 to Popiolek et al., and U.S. Pat. No. 4,182,235 to Harig et al.

SUMMARY OF THE INVENTION

This invention is directed to a twine tie system for round hay balers of the type which incorporate a main hay feed or press roller which works in cooperation with a main belt drive drum and wherein hay is introduced into opposing pairs of relatively yieldable belts which roll the hay introduced between the main feed roller and the main belt drive drum. In the invention, the main hay feed or press roller is modified by providing one or more freely rotatable sheaves along the length thereof which sheaves are aligned with freely rotatable sheaves also provided on the main belt drive drum. A twine feed apparatus is provided which includes a needle for grasping the free end of the twine which is introduced in the area adjacent the opposing sheaves of the hay feed roller and the main belt drive drum so that an intermediate length of the twine may be introduced into the opposing sets of yieldable belts together with the hay with the twine passing between the opposing sheaves so that no friction is placed upon the intermediate length of the twine as it is introduced into the baling machine. After a bale has been rolled to a predetermined size the twine feed mechanism is activated so as to pivot a knotting and cutting assembly which initially knots and then cuts the twine after which the tied bale of hay is discharged in a conventional manner from the baling machine.

In a preferred embodiment at least two sheaves are provided on each of the hay feed or press roller and the main belt drive drum with the sheaves being aligned with one another and with a pair of twine feed members being provided to introduce twine between each set of sheaves. In this manner, each bale of hay is wrapped with two loops of twine which are spaced with respect to one another along the length of the rolled bale. In other embodiments, additional sets of sheaves and twine feed members may be provided as is necessary.

It is a primary object of the present invention to provide a twine feed assembly for round hay balers which effectively ties the bales of hay utilizing a minimum amount of twine thereby reducing the overall cost of the baling.

It is yet another object of the present invention to provide a twine tie system for round hay balers which allows the twine to be continuously fed into the baling area of the machine together with the incoming hay so that the twine continuously surrounds the exterior surface of the bale as it is formed.

It is also an object of the present invention to provide a twine tie system for use with round hay balers wherein the twine is introduced into the baling area of the machine between freely rotatable sheaves which effectively prevent any binding of the twine as it is played out about the forming bale of hay so that the twine cannot become accidently severed by the action of the oppositely rotating main hay feed roller and main belt drive drum.

DESCRIPTION OF THE PREFERRED EMBODIMENT

Figure 1:
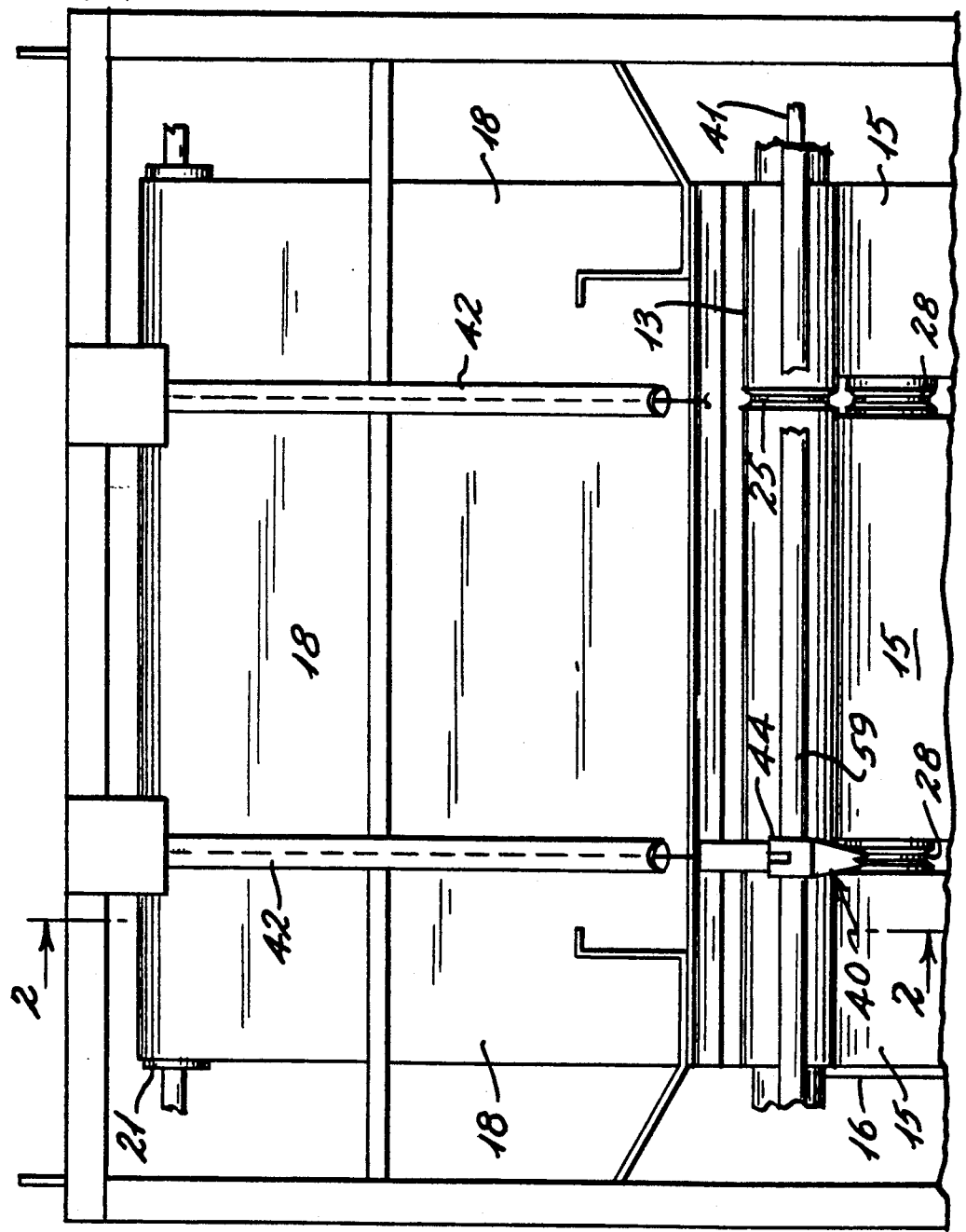
FIG. 1 is a partial front plan view of the twine tie system of the present invention showing one tie feed mechanism which has secured the twine adjacent the entrance between the opposing sheaves associated with the main hay feed roller and the main belt drive drum so that the intermediate length of the twine will be introduced between the opposing sheaves as the hay is introduced between the main hay feed roller and the main belt drive drum.

With continued reference to the drawings, the twine feed and tying assembly of the present invention is disclosed for use with hay baling machines 10 of the type which incorporate a feed conveyor 11 for supplying hay to the bale making assembly 12 of the machine. Such machines include a main hay feed or press roller 13 mounted on a drive shaft 14. The hay is carried into the bale assembly portion of the machine by a plurality of spaced lower continuous belts 14 which are driven by a main belt drive drum 16 which is rotatably mounted to the drum drive shaft 17.

Figure 2:
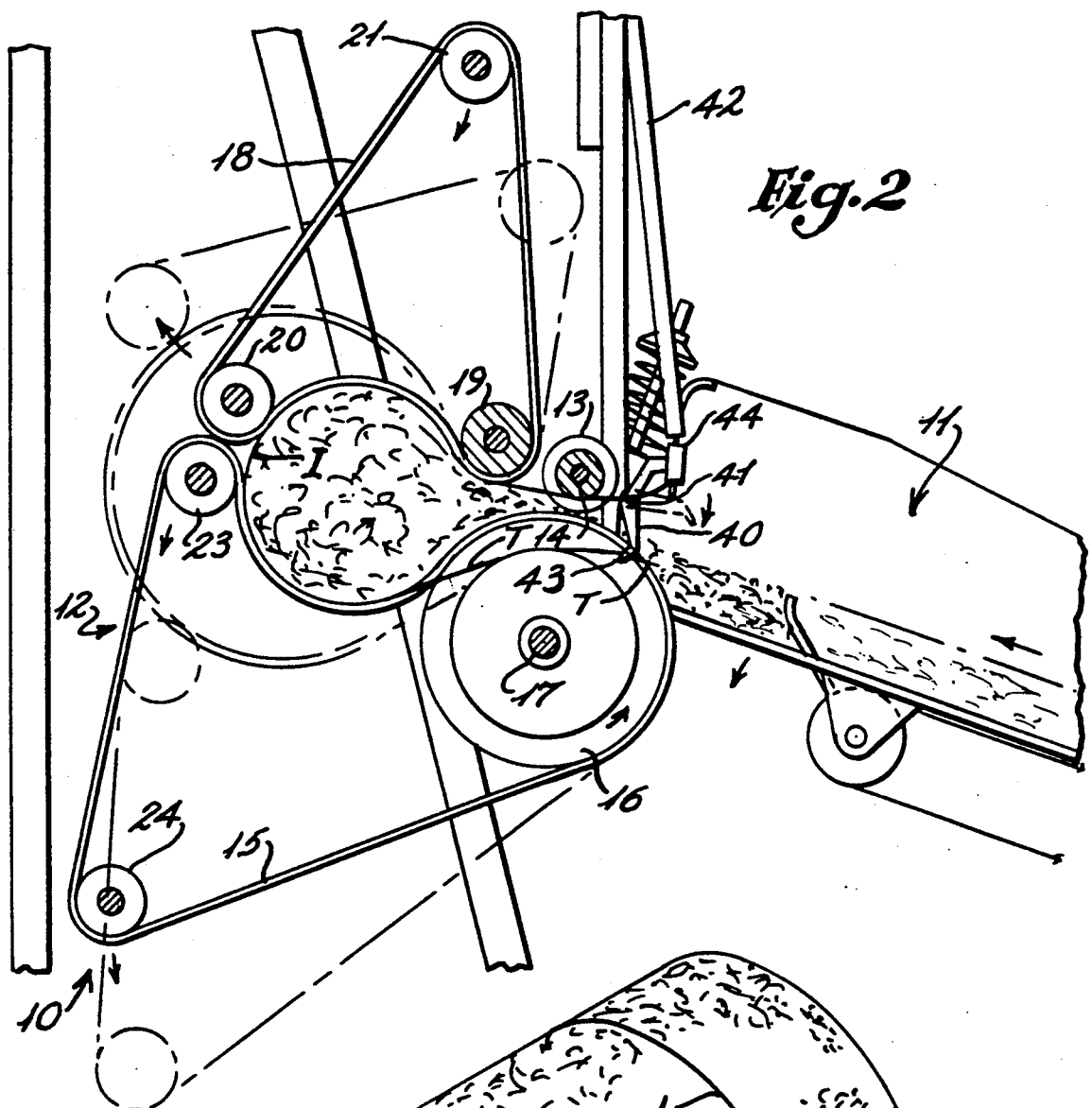
FIG. 2 is a cross sectional view taken through lines 2—2 of FIG. 1 showing in full line the hay and twine being introduced between the opposing expandable continuous hay forming belts and showing in dotted line the relative expansion of the hay bale between the belts as hay is continuously introduced into the baling machine. Also shown is the pivotable action of the twine knotter and cutter assembly and the twine feed needle.

With particular reference to FIG. 2 of the drawings, as the hay enters between the hay feed roller 13 and the primary belt drive drum 16, the hay is introduced between the lower hay bale forming belt 15 and an upper hay bale forming belt 18. Each of the belts 15 and 18 is shown as being continuous with the lower belt driven by the primary drive drum 16 and the upper belt being driven by a secondary drive drum 19. The upper belt is pivotably carried by a pair of spaced roller elements 20 and 21 which are both moveably mounted to the main frame 22 by rocker arm assemblies (not shown). The lower drive belt 15 is also moveable about a pair of guide rollers 23 and 24 which are also pivotably mounted with respect to the main frame by a second rocker elements (not shown). As the hay is rolled between the upper and lower belts, the rocker arm assemblies carried by the main frame will permit the rollers 20 and 21 to pivot upwardly and outwardly as shown in dotted line in FIG. 2 and the lower guide rollers 23 and 24 to pivot outwardly and downwardly also as shown in dotted line in FIG. 2. The control of the movement of the upper and lower belts may be accomplished as is shown in U.S. Pat. No. 2,424,821 to Harrer the teachings of which are incorporated herein by reference. As the method and apparatus for allowing the belts to expand relative to one another to roll the hay there between is conventional, no further discussion is believed necessary with respect thereto.

Figure 3:
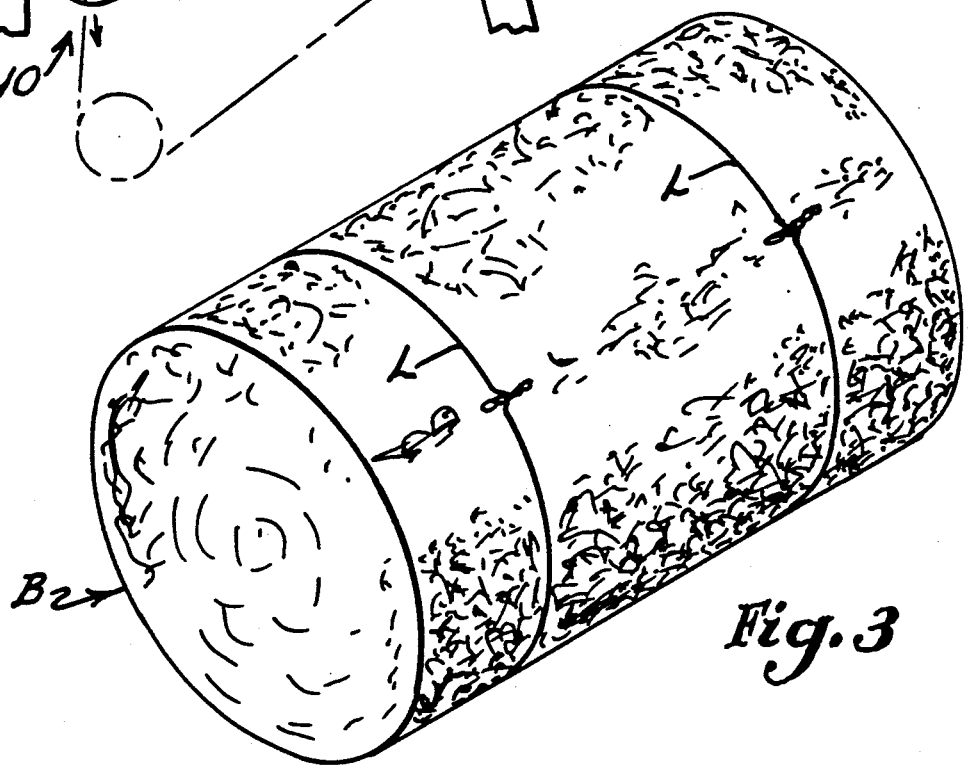
FIG. 3 is an illustrational view showing a formed bale of hay being wrapped with two single loops of twine.

As opposed to prior art hay balers of the type disclosed in U.S. Pat. No. 2,424,821 to Harrer which included a twine tie mechanism which tied each bale after it had been formed by spirally wrapping each bale from one end to the other, the present invention allows the twine to enter into the hay bale forming portion 12 of the hay baler as the hay is introduced in between the upper and lower belts 15 and 18 so that one or more single continuous loop are utilized to bind each bale of hay. As shown in FIG. 3, a bale of hay H has been tied in accordance with the teachings of the present invention wherein two twine feed mechanisms have been incorporated with the hay baling machine. The result is that the bale has been tied at two spaced points by single loops L of twine.

Figure 4:
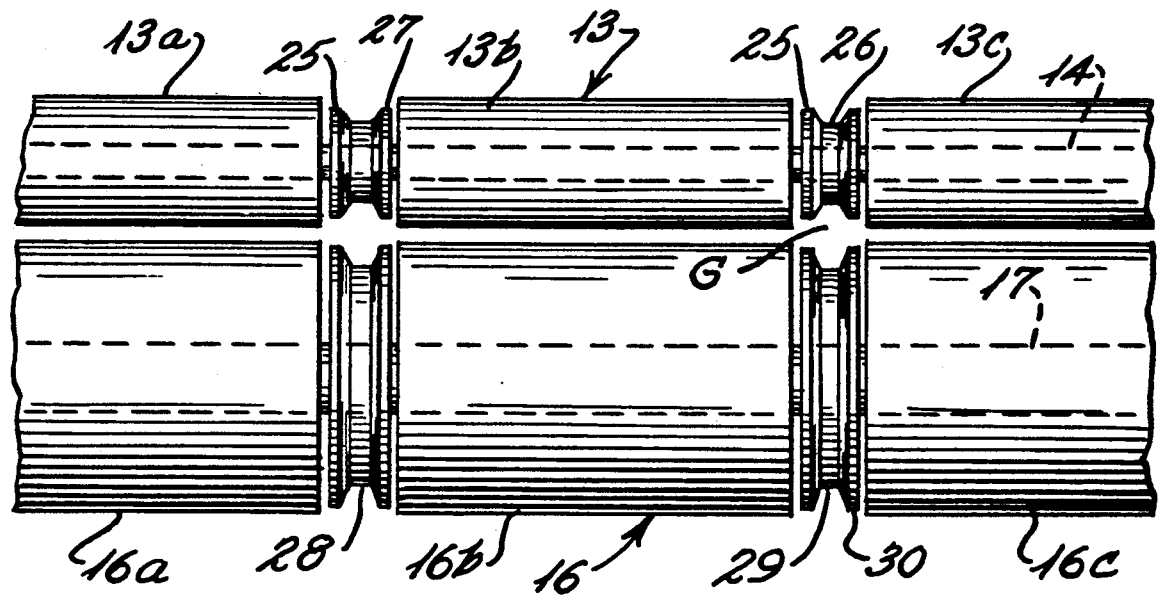
FIG. 4 is an enlarged perspective view showing the sheaves associated with the main hay feed roller and the main belt drive drum.

In order to feed the twine into the hay bale forming portion 12 of the hay baling machine of the present invention, the hay feed roller 13 and primary belt drive drum 16 have been modified The hay feed or press roller 13 has been divided into three segments designated, as shown in FIG. 4, as 13a, 13b, 13c. Each of the segments of the roller are spaced with respect to one another so as to receive a pair of sheaves 25 which are freely rotatably mounted upon the drive shaft 14 of the feed roller. The sheaves are mounted to the drive shaft by suitable roller bearings (not shown). Each sheave is also shown as having a diameter which is slightly less than the diameter of the feed or press roller and also includes a generally centralized groove such as shown at 26 intermediate a pair of angular flanges 27. The primary belt drive drum 16 is also formed into a plurality of spaced segments 16a, 16b and 16c. A pair of sheaves 28 are mounted intermediate the segments of the main belt drive drum with each sheave being shown as being slightly less in diameter than the diameter of the drum. Each sheave 28 is also mounted so as to be in opposing and aligned relationship with respect to the sheaves 25 of the feed or press roller. The sheaves 28 also include an annular groove 29 formed between a pair of outwardly extending flanges 30. The sheaves 28 are freely rotatably mounted to the drive shaft 17 by suitable bearing members (not shown).

As the sheaves 25 and 28 are freely rotatably mounted to the respective drive shafts 14 and 17, as the drive shafts 14 and 17 are rotated, the sheaves may remain stationary with respect to the shafts. In this manner, with the present invention, as twine is fed into the gap G formed intermediate the spaced sheaves 25 and 28, the twine will be guided by the sheaves without rotational friction or binding friction being imparted to the twine as it is introduced into the hay forming portion 12 of the hay baling machine.

Figure 5:
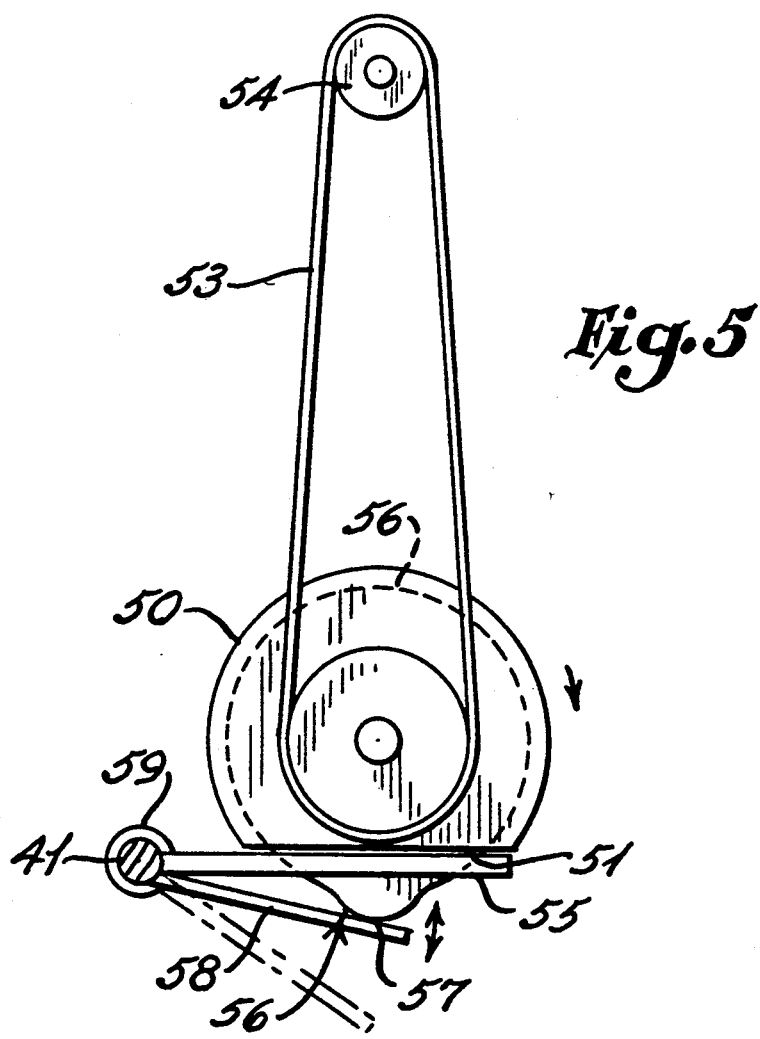
FIG. 5 is an enlarged view of the operating assembly for the twine feed needle.

Although two sets of spaced sheaves are shown in FIG. 5, it should be emphasized that a single set of sheaves mounted between two segments of a hay feed press roller and a primary belt drive drum or additional sets of sheaves may be utilized as is necessary in order introduce the twine to be wrapped in one or more loops fashion around the forming bale of hay.

With particular reference to FIGS. 1, 2 and 5, one example of an apparatus for introducing the twine into the hay forming portion 12 of the hay baling machine is disclosed in greater detail. In the embodiment disclosed, one or more twine feed needles or arms 40 are pivotably carried by a rotatable support shaft 41 so that the needles may be moved between a first raised position, as shown in dotted lines in FIG. 2, to a lowered position adjacent but below the sheaves 28. When the needles are in the raised position, a free end of the twine T guided by a twine feed tube 42 may be engaged by the outer portion 43 of each needle 40. With the twine being engaged by the V-shaped opening 43 of the free end of the needle, the needle is activated so as to pivot from the dotted line position shown in FIG. 2 to a full line position wherein an intermediate portion I of the twine T is positioned in front of the spaced sheaves 25 and 28. In this manner, as hay is introduced between the feed roller 13 and the main belt drive drum 16, the hay will engage the intermediate portion of the twine carrying it into the area between the continuous belts 15 and 18 which form the hay into round bales. The twine is continuously played out through the feed tube 42 as hay is introduced into the machine. The twine will pass in engagement with the sheaves 25 and 26 with the sheaves ensuring that no adverse friction is placed on the twine as it is fed into the bale forming portion of the machine.

Once the bale of hay has achieved a desired dimension or diameter, a knotter and tying assembly 44 is activated so as to first knot and then sever the twine thereby creating a continuous loop which extends around the rolled bale of hay. The knotter and tying assembly may be of a conventional type. After the bale has been knotted and the twine severed, the bale of hay is free to be discharged from the hay forming portion 12 of the baling machine in a manner as shown in the above referenced patent to Harrer which has been incorporated herein by reference. After the twine has been knotted and cut, the twine feed needle 40 is again pivoted to its raised position as shown in dotted line in FIG. 2 wherein the outer end thereof may engage another free end portion of the twine so as to begin a subsequent bale forming operation.

With particular reference to FIG. 5, one type of control assembly for regulating the twine feed needle and knotter and cutting mechanism is disclosed in greater detail. The exact type of knotter and cutter assembly may be varied with any conventional typer assembly being appropriate for use in combination with the elements of the present invention. In FIG. 5, the rotatable shaft 41 to which the feed needle is secured is shown as being acted upon by a rotating cam element 50 which has an elongated flattened or face portion 51. The rotary cam 50 is mounted on a drive hub 52 which is driven by way of a belt or chain 53 connected to a drive pulley 54 which is driven in a timed manner by gearing (not shown) to the main drum drive shaft. In this manner, the rate of rotation of the rotary cam 50 may be selectively timed with the driving of the hay forming belts so that upon a given number of rotations of the belts in the hay forming portion of the hay baling machine, the rotary cam will make a complete revolution thereby controlling the effective movement of the needle to introduce the twine relative to the sheaves through which the twine will pass into the area between the forming belts of the hay baling machine.

In FIG. 5, the rotatable shaft 41 has an arm 55 extending therefrom which is shown in full line position at which time the needle is in the dotted line position shown in FIG. 2. Upon rotation of the rotary cam 50 in the direction shown by the arrow in FIG. 5, the arm 55 will be forced downwardly to the dotted line position thereby rotating the shaft 41 to which the feed needle 40 is secured. In this manner, the feed needle is moved from the position in which a free end of twine is engaged by the outer portion thereof to a position in which the intermediate length of twine extends across the area between the two sheaves so that twine may be introduced into the hay forming portion of the machine simultaneously with the introduction of the hay. Further, the rotary cam will retain the shaft 41 in a position with the needle below the gap G formed between the spaced sheaves 25 and 28 until such time as a full bale has been rolled. At this point, the face portion 51 of the cam will allow the arm 55 secured to the shaft 41 to assume the full line position as shown in FIG. 5 and thereby raising the needle.

In order to coordinate the operation of the knotting and severing mechanism 44, a second rotary cam 56 is rotated in tandem relationship to the rotary cam 50 on the same drive shaft 57. The rotary cam 56 includes a raised cam portion 57 which is selectively engageable with an arm 58 secured to pivotable tubular shaft 59 to which the knotter and cutting mechanism 44 is secured. As the rotary cam 56 is rotated in the direction of the arrow shown in FIG. 5, the cam portion 57 will periodically engage the arm 58 thereby rotating the tubular shaft 59 and effectively pivoting the knotter and cutting mechanism 44 from a full line position as shown in FIG. 2 to a lower position adjacent the full line positioning of the needle in FIG. 2. The rotary cam 56 is secured to the shaft 57 so that the cam portion 57 thereof engages the arm 58 only when the face portion 51 of the rotary cam 50 begins to move into opposing relationship with the arm 55. In this manner, as the feed needle mechanism 40 is beginning to be raised to the dotted line position shown in FIG. 2, the knotting and cutting assembly is being activated and being urged to a lower position so that the free end of the twine carried by the needle 40 may be knotted and thereafter the twine severed allowing the loop of twine to enter between the hay forming belts of the baling machine.

With the present invention, a separate hay feed needle knotting and cutting mechanism are required in the area adjacent each of the spaced sheaves 25 and 28 to effectively control the feeding of the twine into the hay bale forming portion of the baling machine.

The twine being introduced through the feed tubes 42 is controlled by any type of conventional twine supply system such as the one disclosed in the patent to Harrer discussed above.

I claim:

1. In a baling machine for baling round bales of incoming hay wherein the machine includes a feed press roller mounted to a roller drive shaft so as to be in substantially parallel relationship to a main belt drive drum which is rotatably carried by a drum drive shaft and wherein a plurality of spaced hay rolling belts are drivingly engaged to the main belt drive drum in spaced relationship to one another and wherein the machine includes a source of twine from which twine is directed to a twine feed means so that the twine may be selectively urged between the hay feed roller and the main belt drive drum the improvement comprising, forming each of the hay feed press roller and main belt drive drum with at least two-spaced cylindrical segments which are aligned along their respective drive shafts, a first sheave means freely rotatably mounted about the roller drive shaft intermediate said segments of said hay feed press roller, second sheave means freely rotatably mounted to said drum drive shaft and intermediate said sections of the main belt drive drum, said first and second sheaves being aligned in space relationship with respect to one another, the twine feed means including a feed element adjacent said first and second sheaves, said feed element being engageable with the twine, means for urging said feed element toward said first and second sheave means so that an intermediate length of the twine is aligned between said first and second sheave means so as to be engageable by incoming hay, said intermediate portion of said twine being guided between said first and second sheaves so as to expand into a loop about the incoming hay as the hay is rolled, and a knotting and cutting means for knotting the twine to form a continuous loop about the rolled bale of hay and therafter to cut the twine whereby the rolled and tied bale may be discharged from the baling machine.

2. The baling machine of claim 1 included at least two first sheave means freely rotatably mounted in spaced relationship to said roller drive shaft and at least the second sheave means freely rotatably mounted in spaced relationship to said drum drive.

3. In a baling machine for baling round bales of incoming hay wherein the machine includes a feed press roller mounted to a roller drive shaft so as to be in substantially parallel relationship to a main belt drive drum which is rotatably carried by a drum drive shaft and wherein a plurality of spaced hay rolling belts are drivingly engaged to the main belt drive drum in spaced relationship to one another and wherein the machine includes a source of twine from which twine is directed to a twine feed tube so that the twine may be selectively urged between the hay feed roller and the main belt drive drum the improvement comprising, forming each of the hay feed press roller and main belt drive drum with at least two-spaced cylindrical segments which are aligned along their respective drive shafts, a first sheave means freely rotatably mounted about the roller drive shaft intermediate said segments of said hay feed press roller, second sheave means freely rotatably mounted to said drum drive shaft and intermediate said sections of the main belt drive drum, said first and second sheaves being aligned in space relationship with respect to one another, the twine feed tube including a feed end adjacent said first and second sheaves, needle means having a portion for engaging the twine from the feed end of the twine feed tube, pivot means for selectively pivoting said needle means relative to said first and second sheave means so that an intermediate length of the twine is aligned between said first and second sheave means so as to be engageable by incoming hay, said intermediate portion of said twine being guided by said first and second sheaves so as to expand into a loop about the incoming hay as the hay is rolled, and a knotting and cutting means for knotting the twine to form a continuous loop about the rolled bale of hay and therafter to cut the twine whereby the rolled and tied bale may be discharged from the baling machine.

4. The baling machine of claim 3 included at least two first sheave means freely rotatably mounted in spaced relationship to said roller drive shaft and at least the second sheave means freely rotatably mounted in spaced relationship to said drum drive.

5. The baling machine of claim 4 including second pivot means for pivotably mounting said knotting and cutting means relative to said first and second sheave means.

* * * * *